(12) United States Patent
Lidstrom et al.

(10) Patent No.: US 7,564,892 B1
(45) Date of Patent: Jul. 21, 2009

(54) SATELLITE TRANSCODER

(75) Inventors: Mats Lidstrom, San Diego, CA (US);
Lior Levin, La Jolla, CA (US);
Abraham Krieger, San Diego, CA (US)

(73) Assignee: NXP B.V., Eindhoven (NL)

( * ) Notice: Subject to any disclaimer, the term of this patent is extended or adjusted under 35 U.S.C. 154(b) by 899 days.

(21) Appl. No.: 10/611,400

(22) Filed: Jun. 30, 2003

(51) Int. Cl.
*H04B 3/36* (2006.01)

(52) U.S. Cl. ...................................... 375/211

(58) Field of Classification Search ................. 375/240, 375/279, 329, 211; 455/114.3; 341/110, 341/144; 370/206; 367/138; 332/103; 380/217; 725/116
See application file for complete search history.

(56) References Cited

U.S. PATENT DOCUMENTS

| | | | |
|---|---|---|---|
| 5,504,816 A * | 4/1996 | Hamilton et al. | 380/217 |
| 5,764,113 A * | 6/1998 | Snell | 332/103 |
| 5,923,642 A * | 7/1999 | Young | 370/206 |
| 6,011,950 A * | 1/2000 | Young | 725/67 |
| 6,363,033 B1 * | 3/2002 | Cole et al. | 367/138 |
| 6,459,427 B1 * | 10/2002 | Mao et al. | 725/109 |
| 6,590,515 B1 * | 7/2003 | Dacy et al. | 341/144 |
| 6,768,434 B1 * | 7/2004 | Gumm | 341/110 |
| 6,771,710 B1 * | 8/2004 | Myers | 375/298 |
| 7,002,898 B1 * | 2/2006 | Lou | 370/204 |
| 2002/0181604 A1 * | 12/2002 | Chen | 375/279 |
| 2003/0039321 A1 * | 2/2003 | Lee et al. | 375/329 |
| 2004/0142667 A1 * | 7/2004 | Lochhead et al. | 455/114.3 |
| 2004/0161031 A1 * | 8/2004 | Kwentus et al. | 375/240 |
| 2006/0259937 A1 * | 11/2006 | Fries | 725/116 |

OTHER PUBLICATIONS

HSP45116A data sheet "Numerically Controlled Oscillator / Modulator"; Apr. 1999; pp. 3-1-to-3-17; http://www.intersil.com/data/fn/fn4156.pdf.*
IRT 1000 Integrated Receiver Transcoder. Installation and Operation Manual 1996, pp. 1-1 to 2-12.*
STMicroelectronics, "STVO399 Front-End Single Chip for Digital Satellite Broadcasting", 2001, p. 1.*

* cited by examiner

*Primary Examiner*—Don N Vo

(57) ABSTRACT

A transcoder is described for converting a received first digital signal with a first modulation and encoding scheme to a second digital signal with a second modulation and encoding scheme. The transcoder may include a demodulator that produces a demodulated digital stream of data from the received first digital signal and a modulator in signal communication with the demodulator, where the modulator modulates the digital stream of data with the second modulation and encoding scheme. Additionally, the transcoder may include an upconverter in signal communication with the modulator, where the upconverter produces the second digital signal.

24 Claims, 7 Drawing Sheets

SATELLITE TRANSCODER

BACKGROUND OF THE INVENTION

1. Field of the Invention

This invention relates generally to satellite communication systems. In particular, this invention relates to a transcoder for efficiently converting satellite data encoded in one satellite modulation scheme to another.

2. Related Art

From the inception of convenient direct broadcast satellite ("DBS") services such as DBS service providers DirectTV® and DISH Network® in the United States and similar services around the world, there has been a tremendous growth in the number of DBS subscribers. As more subscribers enroll in DBS services, DBS service providers are offering a greater number of services including, but not limited to, addition pay-per view, high definition Television ("HDTV"), broadband Internet, satellite radio transmission, and other bandwidth-intensive services. As such, DBS providers require higher throughput to offer these bandwidth-intensive services to their growing number of subscribers.

In the past, DBS service providers typically utilized a digital modulation scheme known as Quadrature Phase Shift Keying ("QPSK") to modulate their DBS signals. QPSK allows for low signal-to-noise ratios (known as "S/N" or "SNR") with relatively high throughput data communication between a broadcasting satellite and a DBS set-top module (i.e., a "set-top box") in the premises of a subscriber.

FIG. 1 is a block diagram of an example prior art implementation of a typical DBS service connection 100 between a broadcasting DBS satellite 102 and a QPSK DBS set-top module 104 located at the premises 106 of a subscriber. In FIG. 1, the subscriber has the QPSK DBS set-top module 104, an antenna 108, low noise block downconverter ("LNB") 110, and video monitor 112 located within the subscriber premises 106. The subscriber premises 106 may be either a place of business or a personal residence. The LNB 110 may be any device that converts a whole band (or "block") of frequencies to a lower band of frequencies. The QPSK DBS set-top module 104 may be any generally known QPSK DBS set-top box similar to the set-top boxes produced by multiple manufactures for both DirectTV® and DISH Network®, or other similar type of DBS service provider. The video monitor 112 may be any device capable of receiving the information delivered by the QPSK DBS set-top module 104. Examples of the video monitor 112 may include a television set, a television monitor (without a television receiver), a computer monitor, and/or a video recording device. The antenna 108 may be any device capable of receiving transmissions from DBS satellite 102. Examples of the antenna 108 may include an 18-inch reflector antenna (typically know as a "dish antenna") or any other type of antenna such as a phased array, patch, and/or active or passive antenna.

As an example of operation, the DBS satellite 102 transmits a signal to the satellite antenna 108 via transmission path 114. The antenna 108 receives the signal and passes the received signal to the LNB 110 that down converts the received signal to a lower frequency band. The LNB 110 then passes, via signal path 116, the down-converted signal to the QPSK set-top module 104. The QPSK set-top module 104 then demodulates and decodes the down-converted signal and produces an output signal that is passed to the video monitor 112 via signal path 118.

Unfortunately, presently available QPSK transmission schemes will not be able to support the greater bandwidth-intensive services desired by the DBS services providers. As a result, DBS service providers have been experimenting with new transmission schemes to try to support the greater bandwidth-intensive services. Some of these new transmission schemes have included utilizing Turbo Codes, which achieve near-capacity performance on the additive white Gaussian noise channel.

In response, there is presently a movement to switch DBS transmissions from the old QPSK transmission schemes to new transmission schemes based on 8-PSK Turbo Coding, which may increase the throughput for advanced DBS services by as much as 50% over present commercial satellite links, while still being compatible with the existing DBS infrastructure. Generally, this approach provides DBS service providers with an efficient method of increasing throughput over the existing satellite infrastructures while providing new services for their customers.

Unfortunately, switching transmission schemes will typically force established DBS subscribers to upgrade their reception equipment because the old QPSK set-top modules cannot decode the new 8-PSK Turbo Coded transmissions. Therefore, there is a need for a system that allows established DBS subscribers to receive the new 8-PSK Turbo Coded transmission with their old QPSK set-top modules (also known as a "legacy set-top module").

SUMMARY

A transcoder is described for converting a received first digital signal with a first modulation and encoding scheme to a second digital signal with a second modulation and encoding scheme. The transcoder may include a demodulator that produces a demodulated digital stream of data from the received first digital signal and a modulator in signal communication with the demodulator, where the modulator modulates the digital stream of data with the second modulation and encoding scheme. Additionally, the transcoder may include an upconverter in signal communication with the modulator, where the upconverter produces the second digital signal.

The transcoder may operate by converting a received first digital signal to a second digital signal. As an example of operation, the transcoder may upsample the first digital signal to produce an upsampled signal and may modulate the upsampled signal to produce an intermediate frequency ("IF") signal from the upsampled signal. The transcoder may also convert the digital signal to an analog signal with a digital-to-analog ("DAC").

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
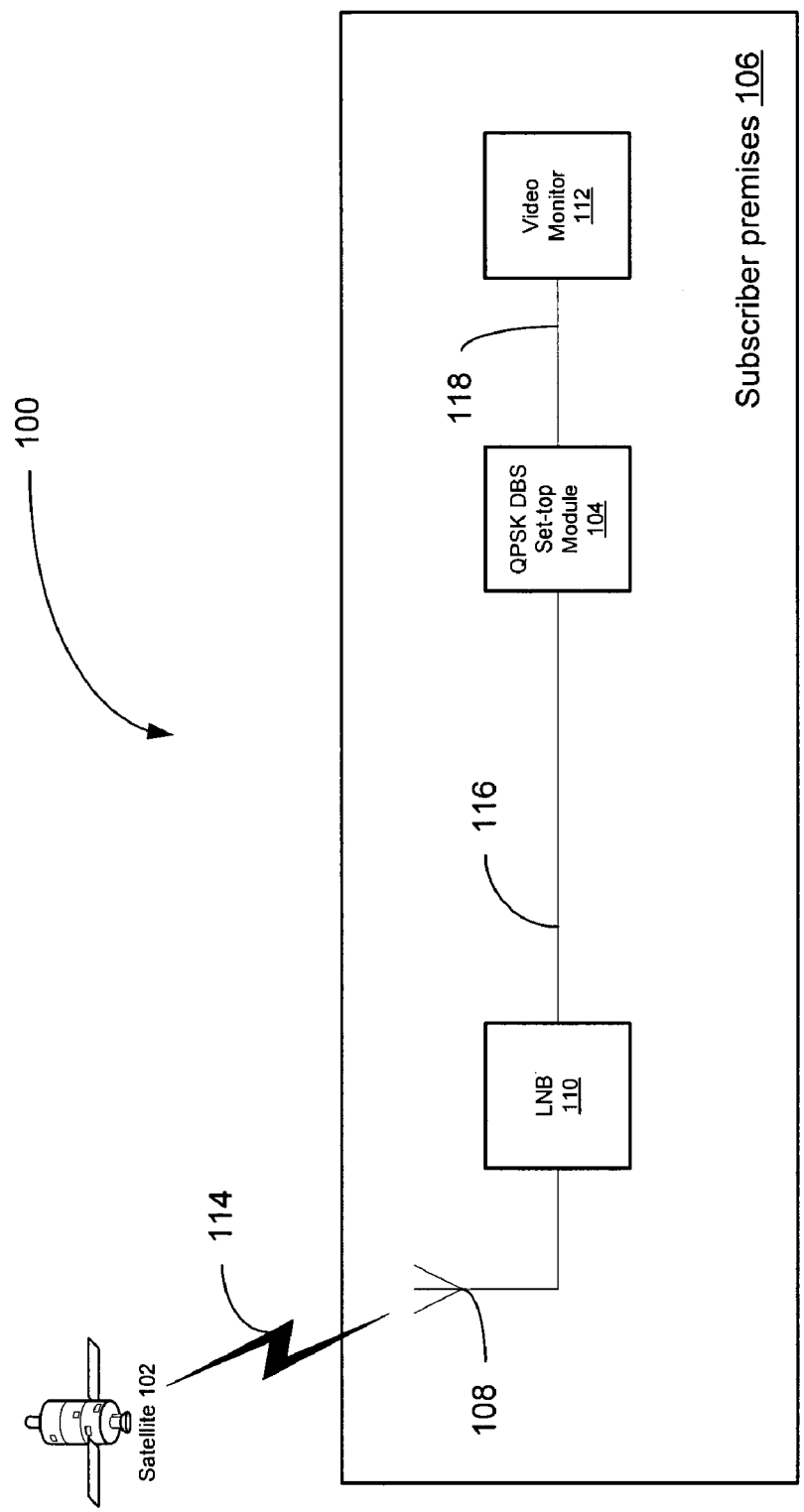
FIG. 1 is a block diagram of an example prior art implementation of a typical service connection between a broadcasting DBS satellite and a QPSK DBS set-top module located at the premises of a subscriber.
Figure 2:
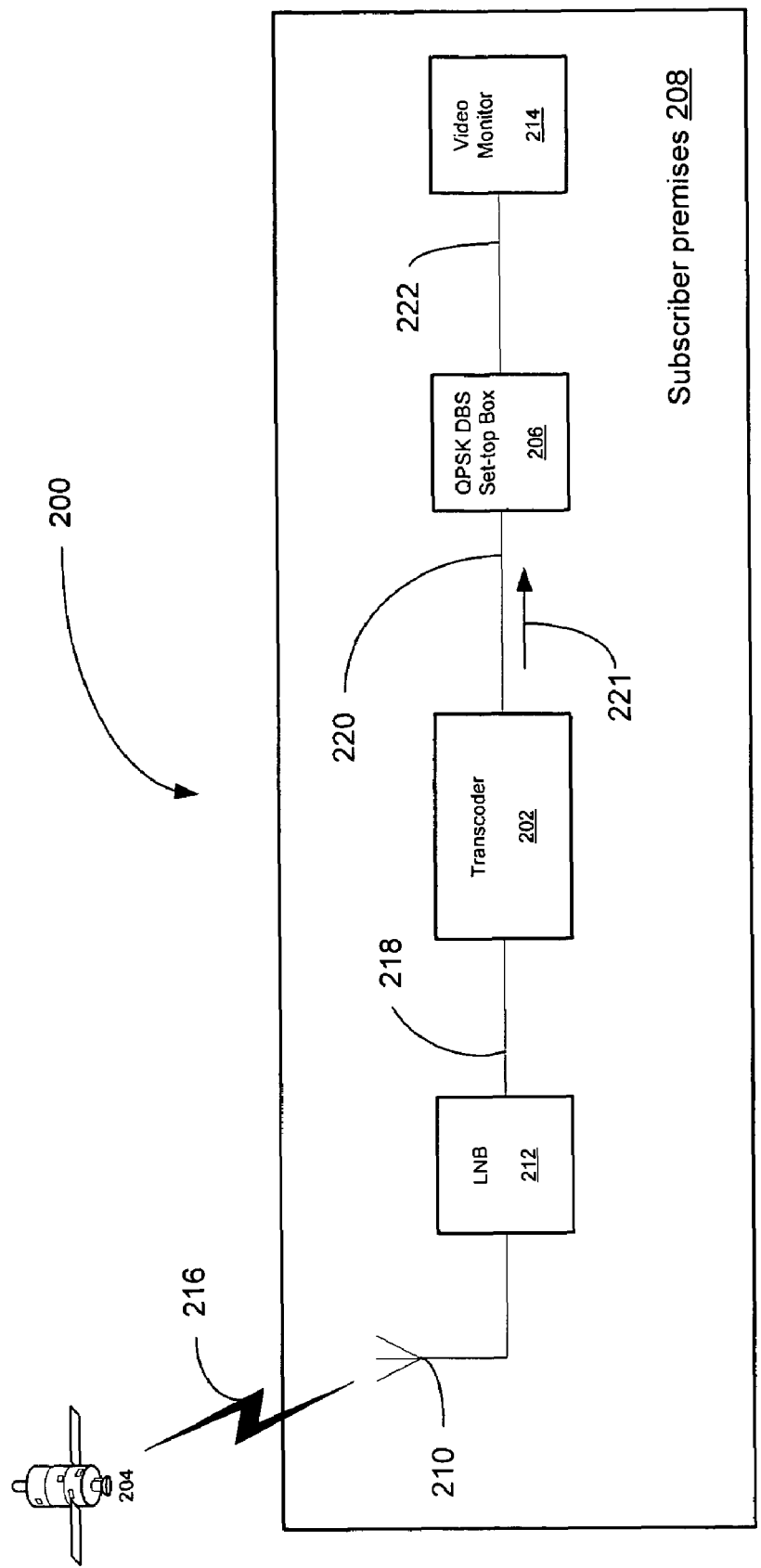
FIG. 2 is a block diagram of an example implementation of a transcoder with a typical service connection between a broadcasting DBS satellite and a QPSK DBS set-top module located at the premises of a subscriber.

In FIG. 2, a block diagram 200 is shown of an example implementation of satellite transcoder 202 within a typical DBS service connection between a broadcasting DBS satellite 204 and a QPSK DBS set-top module 206 located at the premises 208 of a subscriber. The QPSK DBS set-top module 206 may be the same QPSK DBS set-top module 106 described in FIG. 1. In FIG. 2, the subscriber premises 208 may include the QPSK DBS set-top module 206, transcoder 202, an antenna 210, a low noise block downconverter or amplifier ("LNB") 212, and a video monitor 214. As described before, the subscriber premises 208 may be either a place of business or a personal residence. The LNB 212 may be any device that converts a whole band (or "block") of frequencies to a lower band of frequencies. The QPSK DBS set-top module 206 may be any generally known QPSK DBS set-top box similar to the set-top boxes produced by multiple manufactures for both DirectTV® and DISH Network®, or other similar type of DBS service provider. In general, it is appreciated by one skilled in the art that the QPSK DBS set-top module 206 may include a QPSK decoder (not shown) and a single stage direct conversion demodulator (not shown) or multi-stage demodulator (not shown), all three of which are well-known in the art. The video monitor 214 may be any device capable of receiving the information delivered by the QPSK DBS set-top module 206. Examples of the video monitor 206 may include a television set, a television monitor (without a television receiver), a computer monitor, and/or a video recording device. The antenna 210 may be any device capable of receiving transmissions from DBS satellite 204. Examples of the antenna 210 may include an 18-inch reflector antenna (typically know as a "dish antenna") or any other type of antenna such as a phased array, patch, and/or active or passive antenna. The DBS satellite 204 may be a satellite that is transmitting signals modulated with an 8-PSK Turbo Coded modulation scheme.

As an example of operation, the DBS satellite 204 transmits an 8-PSK Turbo Coded signal to the satellite antenna 210 via transmission path 216. The antenna 210 receives the 8-PSK Turbo Coded signal and passes the received 8-PSK Turbo Coded signal to the LNB 212 that block converts the received 8-PSK Turbo Coded signal. The LNB 212 then passes, via signal path 218, the received 8-PSK Turbo Coded signal to the transcoder 202. The transcoder 202 then demodulates the received 8-PSK Turbo Coded signal to create an error free MPEG 2 digital stream of data (generally known as a "transport stream"). The transcoder 202 then QPSK modulates the MPEG 2 transport stream and up converts it to a higher frequency QPSK signal 221 (such as an L-band frequency between 950 MHz to 1150 MHz), which is passed, via signal path 220, to the QPKS DBS set-top module 206. The QPSK DBS set-top module 206 then demodulates and decodes the higher frequency QPSK signal 221 and produces an output signal that is passed to the video monitor 214 via signal path 222.

In general, the transcoder 202 may act as a fully digital converter that converts the received MPEG 2 transport stream on the received 8-PSK Turbo Coded signal to a MPEG 2 transport stream on a QPSK signal 221 that can be received and decoded by a traditional QPSK DBS set-top box 206. Within the transcoder 202, the MPEG 2 transport stream may be first processed by a traditional QPSK I/Q generation technique with typical shaping filters that produce a QPSK processed signal. Then the QPSK processed signal may be upsampled with an upsampler to a final sampling frequency producing an I/Q baseband signal. The I/Q baseband signal may then be processed by an I/Q modulator that utilizes a direct digital synthesizer ("DDS") acting as the local oscillator to bring the I/Q baseband signal up to an intermediate frequency ("IF") carrier frequency producing an I/Q IF signal. The I/Q IF signal may be passed to a digital-to-analog converter ("DAC") that feeds to a band pass filter ("BPF") and then to a coaxial cable.

Figure 3:
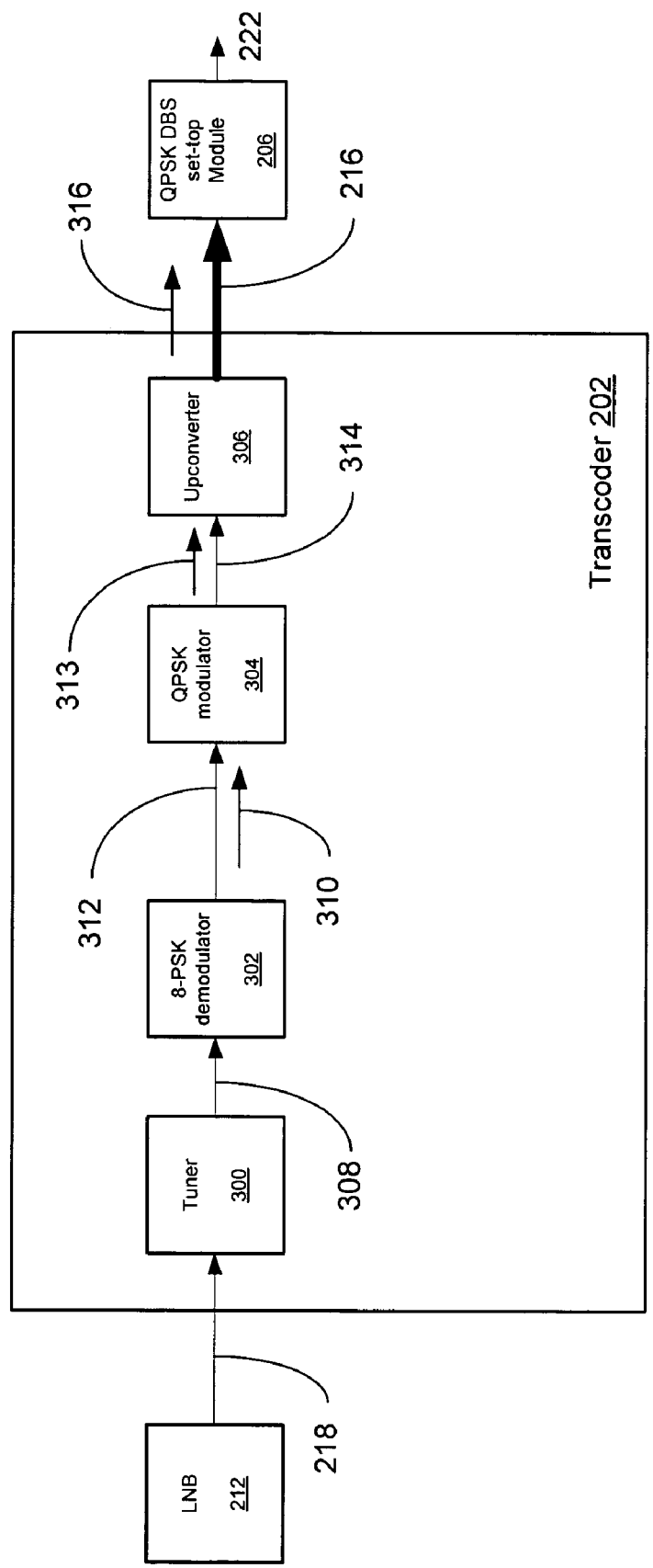
FIG. 3 is a block diagram of an example implementation of the transcoder shown in FIG. 2.

FIG. 3 is a block diagram of an example implementation of a transcoder 202 shown in FIG. 2. The transcoder 202 may include a tuner 300, an 8-PSK Turbo Code demodulator 302, a QPSK modulator 304 and an Upconverter 306. In operation, the Tuner 300 receives the down-converted 8-PSK Turbo Coded signal, via signal path 218, from the LNB 212. The tuner 300 selects a frequency channel from the down-converted 8-PSK Turbo Coded signal and produces a down-converted 8-PSK Turbo Coded channel signal, which is passed, via signal path 308, to the 8-PSK demodulator 302. The 8-PSK demodulator 302 demodulates the down-converted 8-PSK Turbo Coded channel signal and produces an MPEG-2 transport stream 310 that is passed to the QPSK modulator 304 via signal path 312. The QPSK modulator 304 then receives the MPEG-2 transport stream 310 and modulates the MPEG-2 transport stream 310 to an intermediate frequency ("IF") with a QPSK fixed symbol rate modulation to produce an IF QPSK modulated signal 313 that is passed to the upconverter 306 via signal path 314. The upconverter 306 receives the IF QPSK modulated 313 signal and upconverts the IF QPSK modulated signal 313 to a higher radio frequency ("RF") producing a simulated RF QPSK signal 316. The simulated RF QPSK signal 316 is then passed to the QPSK DBS set-top Module 206 via signal path 216 and the QPSK set-top Module 206 converts the simulated RF QPSK signal 316 to a video signal that is passed, via signal path 222, to the video monitor 214, FIG. 2.

The simulated RF QPSK signal 316 will simulate the QPSK signal that was transmitted from the DBS satellite 102 in FIG. 1 after passing through the LNB 212. Therefore, the transcoder 202 will allow established subscribers, who choose not to replace their old QPSK DBS set-top Modules 206 with a new 8-PSK DBS set-top modules (not shown), to still be able to receive and decode the new 8-PSK Turbo Coded signals from the upgraded 8-PSK DBS satellite 204. In this manner, the transcoder 202 may be a simple add on device that is installed between the established subscribers LNB 110, FIG. 1 and old QPSK DBS set-top module 206.

Figure 4:
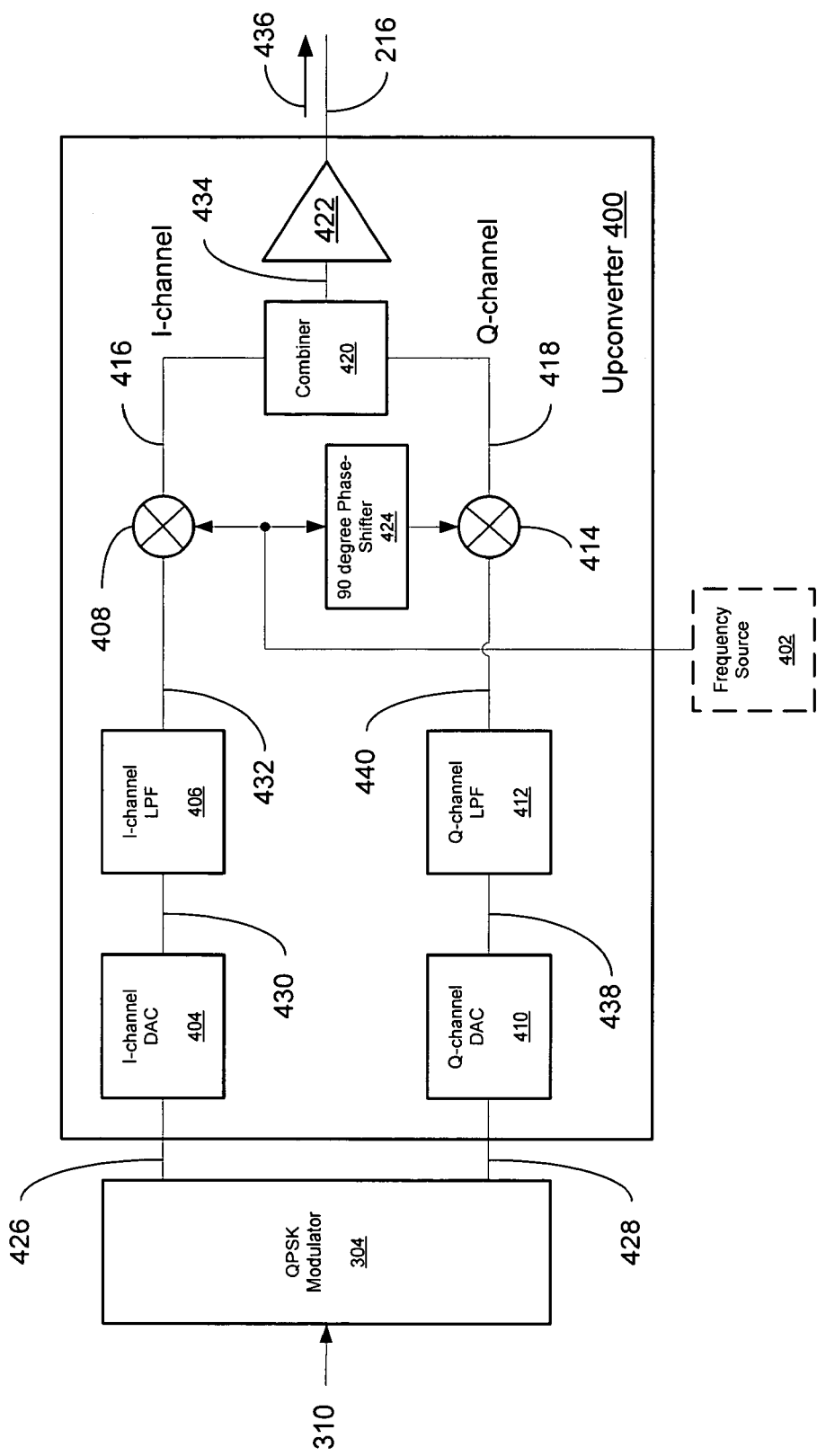
FIG. 4 is a block diagram of an example implementation of the upconverter shown in FIG. 3.

The upconverter 306 may be implemented in numerous ways. As an example, in FIG. 4, a block diagram of an example implementation of an upconverter 400 is shown. The upconverter 400 is in signal communication with the QPSK modulator 304 and a frequency source 402. The upconverter 400 may include two paths for the in-phase ("I" or "I-channel") and quadrature-phase ("Q" or "Q-channel") components output by the QPSK modulator 304. The I path may include an I digital-to-analog converter ("DAC") 404, I low-pass filter ("LPF") 406, and I mixer 408. The Q path may include a Q DAC 410, Q LPF 412, and Q mixer 414. The outputs 416 and 418 are both combined in combiner 420 and passed to amplifier 422. The I mixer 408 and Q mixer 414 may be driven in quadrature by 90 degree phase-shifter 424 or, alternatively, the quadrature I and Q inputs into the complex mixers 408 and 414 may be produced directly by a numerically controlled oscillator ("NCO") (not shown) without the use of the 90 degree phase-shifter 424. The phase-shifter 424 may be feed by frequency source 402, which may be optionally an internal or external component of the Upconverter 400.

In an example operation, the MPEG-2 transport stream 310 is input into the QPSK modulator 304 that produces both an I-channel output signal 426 and Q-channel output signal 428. The I-channel output signal 426 is input into the I DAC 404 and converted into an analog signal 430. The analog signal 430 is input in the I LPF 406, which removes any high and/or mid-range frequency spurious unwanted spectral content. The I LPF 406 output 432 is then passed to the I mixer 408. The I mixer 408 mixes the output 432 from the I LPF 406 with a carrier frequency reference from the frequency source 402 to produce an upconverted output 416 which is combined, in combiner 420, with the output 418 of the Q-mixer 414 and passes the combined signal 434 to the amplifier 422. The amplifier 422 then transmits the simulated RF QPSK signal 436, via a signal path 216, to the QPSK DBS set-top module 206. Similarly, the Q-channel output signal 428 is input into the Q DAC 410 and converted into an analog signal 438. The analog signal 438 is input in the Q LPF 412, which removes any high and/or mid-range frequency spurious unwanted spectral content. The I LPF 412 output 440 is then passed to the I mixer 414. The I mixer 414 mixes the output 440 from the I LPF 412 with a 90 degree phase-shifted carrier frequency reference from the frequency source 402, via the 90 degree phase-shifter 424, to produce an upconverted output 418, which is combined, in combiner 420, with the output 416 of the I-mixer 408 and passed to the amplifier 422.

Figure 5:
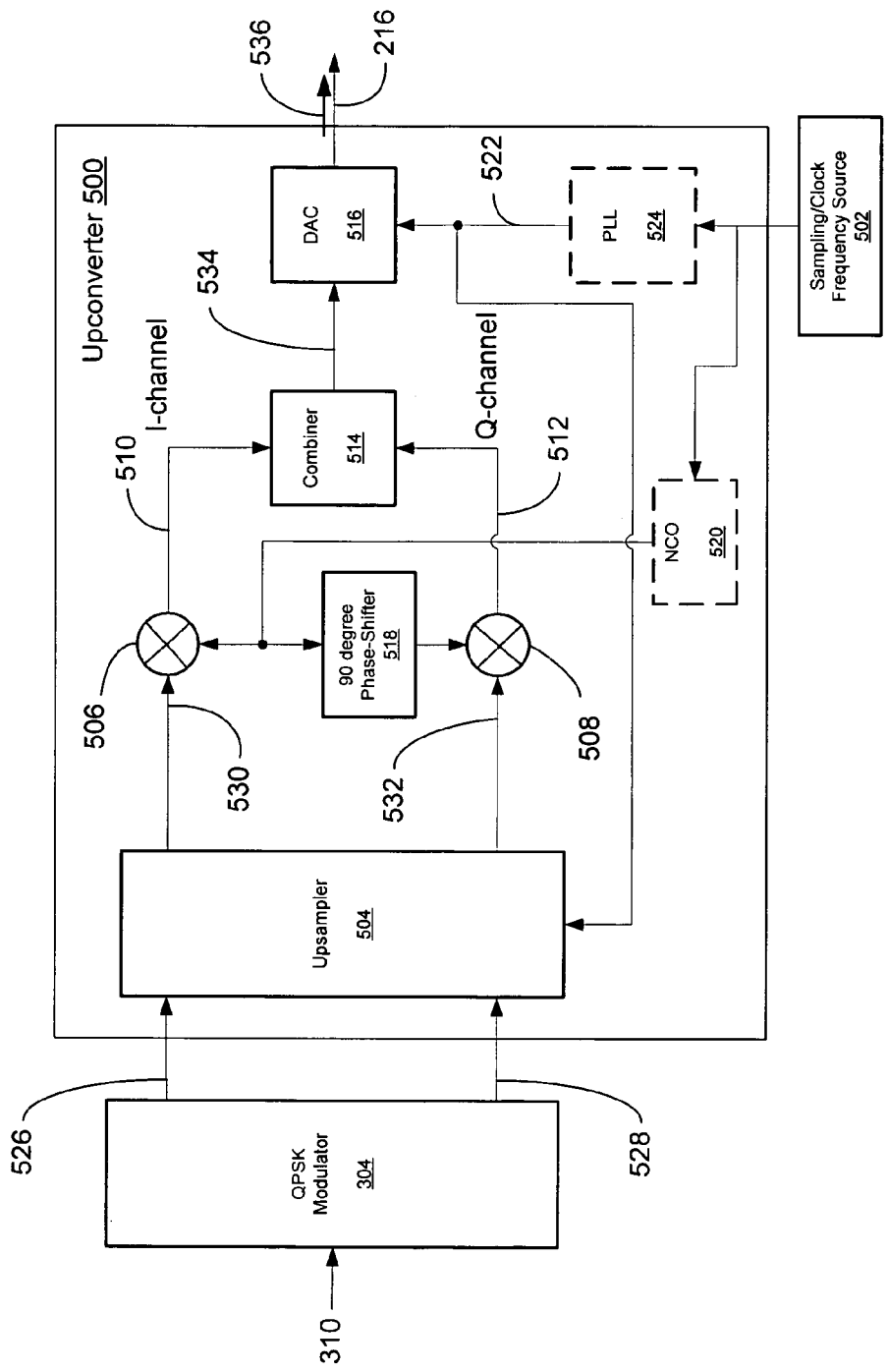
FIG. 5 is a block diagram of an example implementation of the upconverter shown in FIG. 3 utilizing a direct digital-to-analog converter ("DAC") approach.

Alternatively, the upconverter 306, FIG. 3, may be implemented via a direct DAC approach. In this case, FIG. 5 is a block diagram of an example implementation of an upconverter 500 utilizing a direct DAC approach. The upconverter 500 is in signal communication with the QPSK modulator 304 and a frequency source 502, which may be also known as a "clock frequency" and/or "sampling frequency" source (herein referred to as "sampling/clock frequency source"). It is appreciated by those skilled in the art, that the upconverter 500 may include two paths for the I-channel and Q-channel components output by the QPSK modulator 304. The I-channel path may include an Upsampler 504 and I mixer 506. The Upsampler 504 may be a device that moves a low sample rate signal to an interpolated signal that has a higher rate and may include a polyphase interpolation filter.

The Q-channel path may include the Upsampler 504 and a Q-mixer 508. The outputs 510 of the I-mixer 506 and 512 of the Q-mixer 508 are both combined in combiner 514 and passed to a DAC 516. The I-mixer 506 and the Q-mixer 508 may be driven in quadrature by 90 degree phase-shifter 518 or, alternatively, the quadrature I and Q inputs into the complex mixers 506 and 508 may be produced directly by a NCO without the use of the 90 degree phase-shifter 518. The phase-shifter 518 is fed by sampling/clock frequency source 502 via a NCO 520, which may be optionally an internal (such as being on the same "die") or external component of the Upconverter 500. The DAC 516 and the Upsampler 504 may be clocked by a sampling/clock signal ("$F_s$") 522 produced by a timing circuit (not shown) having a phase-locked loop ("PLL") 524, which may be optionally an internal or external component of the Upconverter 500. The PLL 524 is fed by sampling/clock frequency source 502.

In an example operation, the MPEG-2 transport stream 310 is input into the QPSK modulator 304 that produces both an I-channel output signal 526 and Q-channel output signal 528. Both I-channel output signal 526 and the Q-channel output signal 528 are input into the Upsampler 504. The Upsampler 504 samples the I-channel output signal 526 and the Q-channel output signal 528 with clock signal 524 and produces a sampled I-channel output 530 and sampled Q-channel output 532 that are respectively input into the I mixer 506 and Q mixer 508. The I mixer 506 mikes the I-channel output 530 with an intermediate frequency ("IF") reference ("$F_{IF}$") produced by the NCO 520, while the Q mixer 508 mixes the Q-channel output 532 with a IF reference produced by a 90 degree phase-shifted IF reference produced by the NCO 520 via the 90 degree phase-shifter 518. The output 510 of the I mixer 506 and the output 512 of the Q mixer 508 are combined in combiner 514 to produce a combined IF signal 534 that is input into the DAC 516. The DAC 516 then is clocked by sampling/clock signal 522, which may be at a RF frequency, and produces a simulated RF QPSK signal 536. The simulated RF QPSK signal 536 is then passed to the QPSK DBS set-top Module 206 via signal path 216 and the QPSK set-top Module 206 converts the simulated RF QPSK signal 536 to a video signal that is passed, via signal path 222, to the video monitor 214, FIG. 2.

The simulated RF QPSK signal 536 will simulate the QPSK signal that was transmitted from the DBS satellite 102 in FIG. 1 and received through LNB 212. Therefore, the transcoder 202 will allow established subscribers, who choose not to replace their old QPSK DBS set-top Modules 206 with a new 8-PSK DBS set-top modules (not shown), to still be able to receive and decode the new 8-PSK Turbo Coded signals from the upgraded 8-PSK DBS satellite 204. In this manner, the transcoder 202 may be a simple add on device that is installed between the established subscribers LNB 110, FIG. 1 and old QPSK DBS set-top module 206. It is appreciated by those skilled in the art that the frequency accuracy of simulated RF QPSK signal 536 may be controlled by adjusting both the DAC sampling/clock signal 522 and the NCO frequency where adjusting the DAC sampling/clock signal 522 may act as a coarse frequency tuning and the adjusting in the NCO may act as fine frequency tuning.

It is appreciated by one skilled in the art that the simulated RF QPSK signal 536 produced by this direct DAC approach will typically contain a significant amount spurious and unwanted spectral content. However, this spurious and unwanted spectral content should not effect the performance of the QPSK DBS set-top Module 206 in receiving the simulated RF QPSK signal 536 because the simulated RF QPSK signal 536 will typically be transmitted from the DAC 516 to the QPSK DBS set-top Module 206 via signal path 216, which is generally a low-loss coaxial cable or other low-loss non-free space transmission medium. As such, the receiver (not shown) in the QPSK DBS set-top Module 206 will be able to lock on to the simulated RF QPSK signal 536 because these types of receivers are typically designed to lock on to received signals with signal strength between −25 to −65 dBm.

Figure 6:
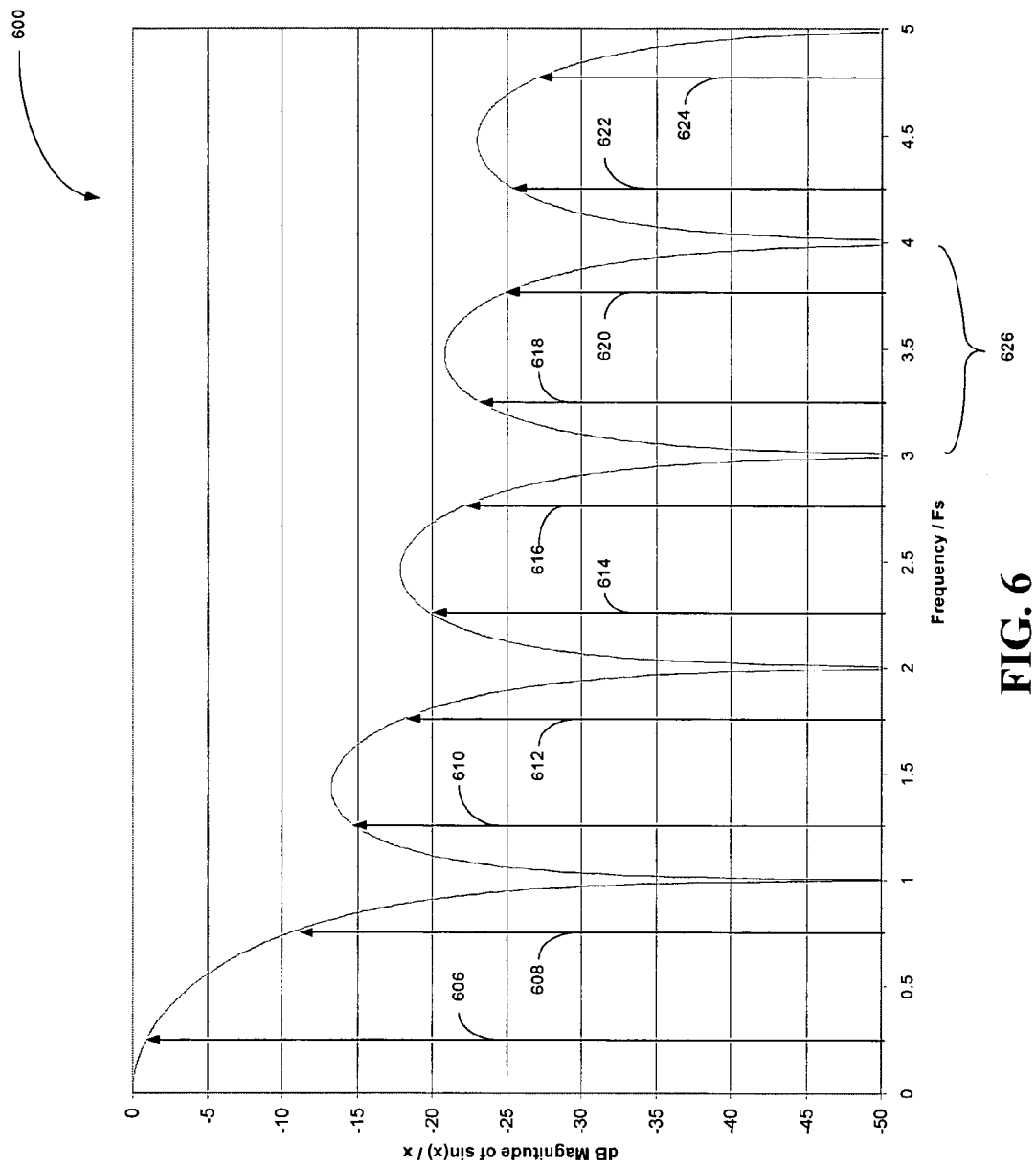
FIG. 6 is plot of an example spectral make-up of the simulated IF plus RF QPSK signal produced by the DAC shown in FIG. 5.

FIG. 6 illustrates an example spectral plot 600 of the simulated RF QPSK signal 536 produced by the DAC 516. The plot 600 represents the signal strength 602 in dB versus normalized frequency 604 (i.e., Frequency divided by sampling frequency "$F_s$") of the simulated RF QPSK signal 536 output by the DAC 516. The simulated RF QPSK signal 536 exhibits a sin(x)/x type roll-off with the fundamental frequency 606 at $F_{IF}$ of the simulated RF QPSK signal 536 being shown plus its images. It is appreciated that plot 600 is representative of the output response of the DAC 516 and sampling replicas. Each sin(x)/x null in the plot 600 (at frequency/$F_s$=1, 2, 3, 4, 5, etc.) represents a sampling frequency ("$F_s$") multiplied by "N" where N may be 1, 2, 3 and so on. It is appreciated by those skilled in the art that within the humps there are numerous sampling replicas of the original signal at normalized frequencies $1-F_{IF}/F_s$, 608, $1+F_{IF}/F_s$ 610, $2-F_{IF}/F_s$ 612, $2+F_{IF}/F_s$ 614, $3-F_{IF}/F_s$ 616, $3+F_{IF}/F_s$ 618, $4-F_{IF}/F_s$ 620, $4+F_{IF}/F_s$ 622, $5-F_{IF}/F_s$ 624, etc., corresponding to frequencies $F_s-F_{IF}$, $F_s+F_{IF}$, $2 F_s-F_{IF}$, $2 F_s+F_{IF}$, $3 F_s-F_{IF}$, $3 F_s+F_{IF}$, $4 F_s-F_{IF}$, $4 F_s+F_{IF}$, $5 F_s-F_{IF}$, and so on. In an example operation, the QPSK DBS set-top Module 206 may lock onto the third 626 or fourth sampling replicas of the simulated RF QPSK signal 536.

Figure 7:
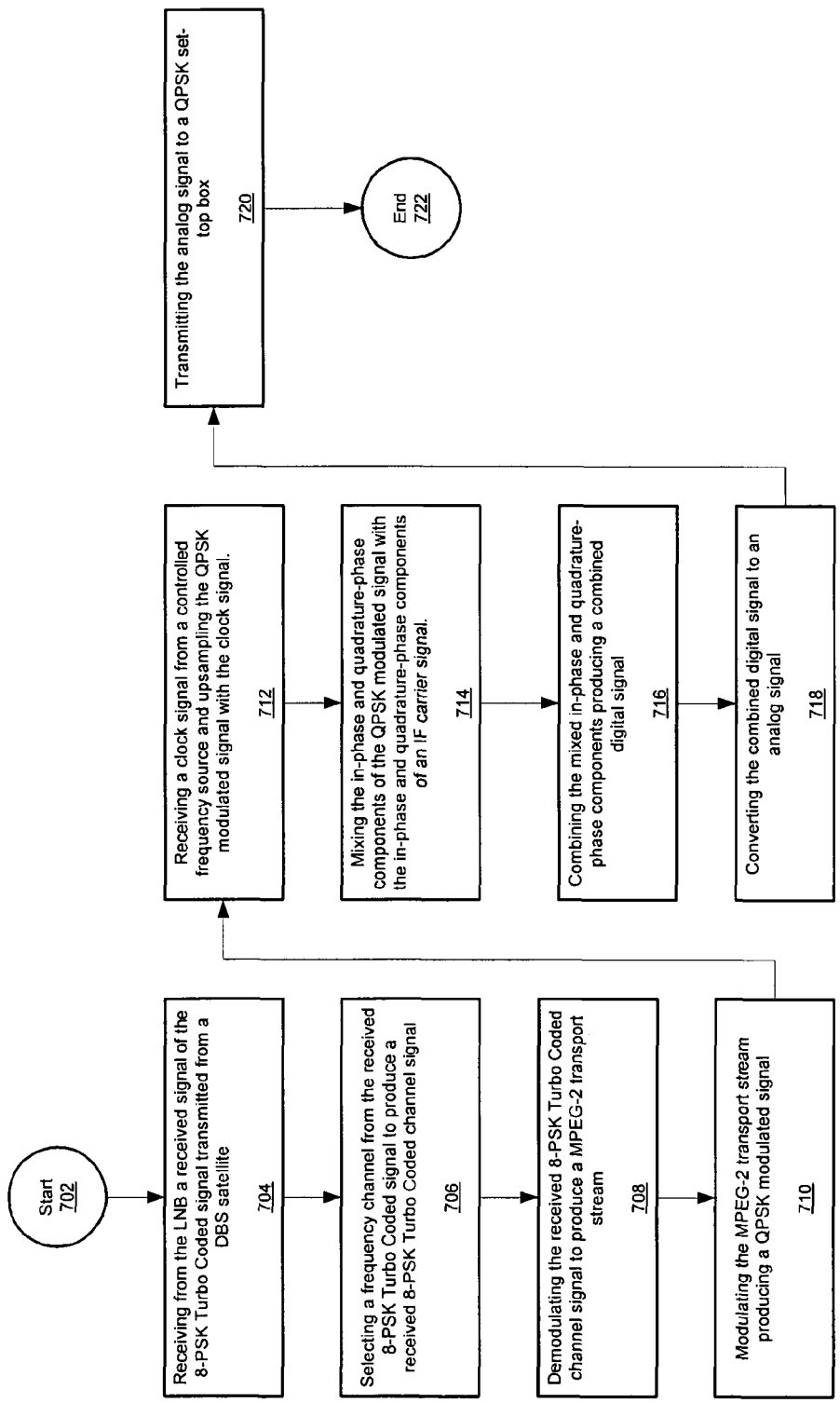
FIG. 7 is a flow-chart of an example process performed by the transcoder shown in FIG. 3.

FIG. 7 is a flow-chart 700 of an example process performed by the transcoder 202 of FIG. 3. In FIG. 7, the process starts at 702, and in step 704, the tuner 300 in the transcoder 202 receives, from the LNB 212, a received signal of the 8-PSK Turbo Coded signal transmitted from the DBS satellite 204. In step 706, the tuner 300 receives the received 8-PSK Turbo Coded signal and selects a frequency channel from the received 8-PSK Turbo Coded signal to produce a received 8-PSK Turbo Coded channel signal and passes it to the 8-PSK demodulator 302. In step 708, the 8-PSK demodulator 302 demodulates the received 8-PSK Turbo Coded channel signal to produce an error free MPEG-2 transport stream that is passed to the QPSK modulator 304. In step 710, the QPSK modulator 304 modulates the MPEG-2 transport stream producing a QPSK modulated signal that is passed to the upsampler 504 of the upconverter 500. In step 712, the upsampler 500 receives a sampling/clock signal from a controlled frequency source and upsamples the IF QPSK modulated signal with the clock signal to produce a sampled QPSK modulated signal. The controlled frequency source may be PLL 524. The sampled QPSK modulated signal is passed as both in-phase and quadrature-phase components to the mixers 506 and 508. In step 714, the mixers 506 and 508 mix the in-phase and quadrature-phase components of the QPSK modulated signal with the in-phase and quadrature-phase components of an IF carrier signal. In step 716, the resulting products of the mixers are combined in a combiner 514 to produce a combined digital signal that is passed to the DAC 516. The DAC 516 converts the combined mixed signal from a digital signal to an analog signal in step 718. Finally, in step 720, the analog signal is transmitted to the QPSK DBS Set-top Module 206 and the process ends 722.

The processes described in FIG. 7 may be performed by hardware or software. If the process is performed by software, the software may reside in software memory (not shown) in the a controller (not shown) in the transcoder 202 and/or a removable memory medium. The software in memory may include an ordered listing of executable instructions for implementing logical functions (i.e., "logic" that may be implement either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While various embodiments of the application have been described, it will be apparent to those of ordinary skill in the art that many more embodiments and implementations are possible that are within the scope of this invention. Accordingly, the invention is not to be restricted except in light of the attached claims and their equivalents. The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A system located at a subscriber's premises, the system comprising:
   an antenna configured to receive, from a satellite, first digital signal with a first modulation and encoding scheme;
   a set-top box configured to receive a second digital signal with a second modulation and encoding scheme; and
   a transcoder that includes
      a demodulator configured to produce a demodulated digital stream of data from the received first digital signal;
      a modulator in signal communication with the demodulator, the modulator configured to modulate the demodulated digital stream of data with the second modulation and encoding scheme to produce a new modulated digital stream of data; and
      an upconverter in signal communication with the modulator, the upconverter configured to produce the second digital signal by upconverting the new modulated digital stream of data and to provide the second digital signal to the set-top box.

2. The system of claim 1, wherein the upconverter includes:
   an upsampler that receives the new modulated digital stream of data from the modulator and produces an upsampled signal;
   a complex mixer in signal communication with the upsampler, where the complex mixer is configured to produce an intermediate frequency ("IF") digital signal by upconverting the upsampled signal with an IF carrier signal; and a combiner in signal communication with the complex mixer, where the combiner is configured to produce the second digital signal having sampling replicas from the IF digital signal.

3. The system of claim 2, wherein the second digital signal includes multiple in-phase and quadrature-phase modulated image replicas.

4. The system of claim 2, wherein a clock signal is input into both the upsampler and a digital-to-analog converter ("DAC") in signal communication with the combiner.

5. The system of claim 4, wherein the complex mixer is connected to a numerically controlled oscillator that produces the IF carrier signal.

6. The system of claim 5, wherein the IF carrier signal is at a lower frequency than the clock signal.

7. The system of claim 5, wherein the numerically controlled oscillator is an internal component of the transcoder.

8. The system of claim 5, wherein the numerically controlled oscillator is an external component of the transcoder.

9. The system of claim 1, wherein the first modulation and encoding scheme is 8-PSK Turbo Coding.

10. The system of claim 9, wherein the second modulation and encoding scheme is QPSK.

11. A transcoder for use in a system, located at a subscriber's premises, that includes an antenna and a set-top box, the antenna configured to receive, from a satellite, a first digital signal with a first modulation and encoding scheme, and the set-top box configured to receive a second digital signal with a second modulation and encoding scheme, the transcoder comprising:

a demodulator configured to demodulate the received first digital signal to produce a demodulated digital stream of data;

a modulator configured to modulate the demodulated digital stream of data with the second modulation and encoding scheme to produce a new modulated stream of data; and an upconverter configured to upconvert the new modulated digital stream of data to produce the second digital signal, and to provide the second digital signal to the set-top box.

12. The transcoder of claim 11, wherein the upconverter includes:

means for upsampling the modulated digital stream and producing an upsampled signal;

means for mixing the upsampled signal with an intermediate frequency ("IF") carrier signal to produce an IF digital signal; and means for converting the IF digital signal to the second digital signal having sampling replicas.

13. The transcoder of claim 12, wherein the second digital signal includes multiple in-phase and quadrature-phase modulated image replicas.

14. The transcoder of claim 12, wherein a clock signal is input into both the upsampling means and a DAC in signal communication with the converting means.

15. The transcoder of claim 14 wherein the mixing means is connected to a numerically controlled oscillator that produces the IF carrier signal.

16. The transcoder of claim 15 wherein the IF carrier signal is at a lower frequency than the clock signal.

17. The transcoder of claim 12, wherein the mixing means is connected to a numerically controlled oscillator that produces the IF carrier signal that is utilized by the mixing means.

18. The transcoder of claim 17, wherein the IF carrier signal is at a lower frequency than the clock signal.

19. The transcoder of claim 11, wherein the first modulation and encoding scheme is 8-PSK Turbo Coding.

20. The transcoder of claim 19, wherein the second modulation and encoding scheme is QPSK.

21. A method for converting a first digital signal with a first modulation and encoding scheme to a second digital signal with a second modulation and encoding scheme, the method comprising:

receiving, at a subscriber's premises, the first digital signal from a satellite;

demodulating the received first digital signal;

modulating the demodulated first digital signal with the second modulation and encoding scheme, wherein the modulating produces a new modulated digital signal;

upconverting the new modulated digital signal to produce the second digital signal; and providing the second digital signal to a set-top box located at the subscriber's premises.

22. The method of claim 21, wherein the step of upconverting includes:

upsampling the new modulated digital signal;

mixing the upsampled new modulated digital signal with an intermediate frequency ("IF") carrier signal to produce an IF digital signal; and sampling the IF digital signal through a mixer to produce the second digital signal.

23. The method of claim 21, wherein the first modulation and encoding scheme is 8-PSK Turbo Coding.

24. The method of claim 23, wherein the second modulation and encoding scheme is QPSK.

* * * * *